United States Patent [19]

Fushchetto

[11] Patent Number: 4,721,376
[45] Date of Patent: Jan. 26, 1988

[54] NON-REACTIVE FLUID CONNECTION DEVICE FOR COOLED MIRRORS

[75] Inventor: Anthony N. Fushchetto, West Redding, Conn.

[73] Assignee: The Perkin-Elmer Corporation, Norwalk, Conn.

[21] Appl. No.: 902,243

[22] Filed: Aug. 29, 1986

[51] Int. Cl.$^4$ .............................. G02B 7/18; G02B 5/08
[52] U.S. Cl. .................................................... 350/610
[58] Field of Search ........................ 350/610, 609, 607

[56] References Cited

U.S. PATENT DOCUMENTS 4,006,973  2/1977  Zanotti et al. ..................... 350/610
4,029,400  6/1977  Eitel ................................... 350/610

FOREIGN PATENT DOCUMENTS 2903804  8/1980  Fed. Rep. of Germany ...... 350/607

Primary Examiner—Jon W. Henry
Attorney, Agent, or Firm—Thomas P. Murphy; Edwin T. Grimes; Francis L. Masselle

[57] ABSTRACT

A non-reactive fluid connection device for cooled mirrors comprising a non-reactive, non-rigid connection joint (10) including at least two manifold blocks (20) oriented orthogonally to each other and containing a free floating self locating sleeve (22) which is pressure balanced to be non-reactive to fluid flowing through the manifold block (10). Each manifold block-sleeve combination (20/22) provides constraint for the mirror (10) and decouples the mirror from influence of the flow of fluid through the connection devices thus eliminating mirror jitter.

4 Claims, 5 Drawing Figures

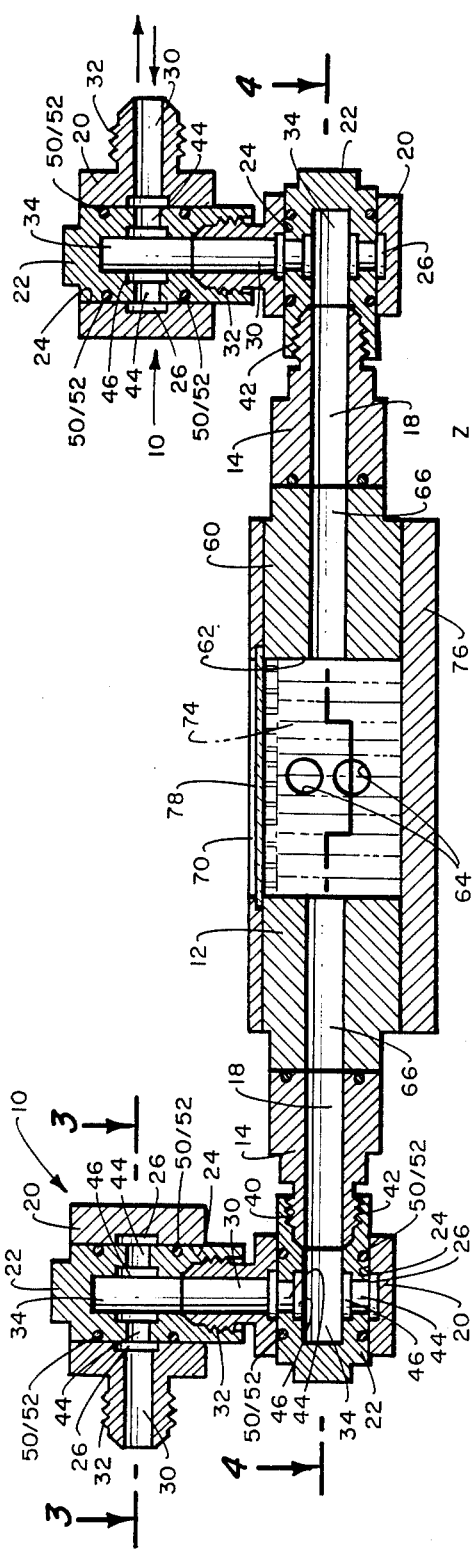
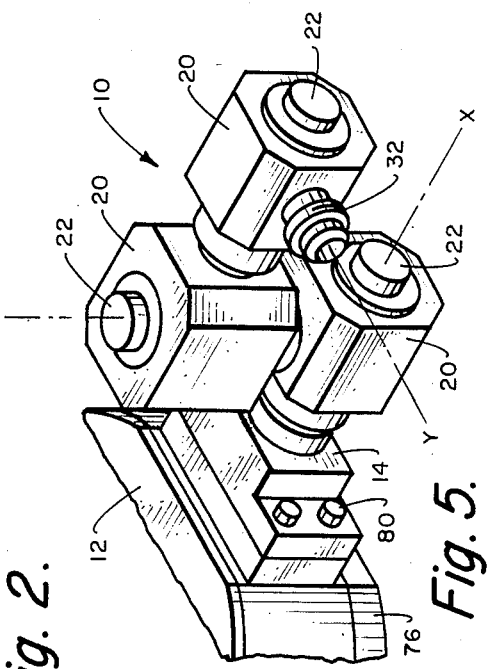
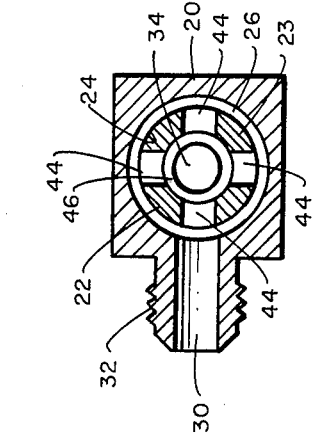

NON-REACTIVE FLUID CONNECTION DEVICE FOR COOLED MIRRORS

BACKGROUND OF THE INVENTION

This invention relates to fluid cooled mirrors and is specifically directed to an improvement in the connection devices where fluid enters and exits to and from the mirror.

Mirrors, which are used to direct and control high energy beams, such as high energy laser beams, absorb high amounts of energy and must be cooled by water, or other suitable fluid, to maintain proper operating conditions and to prevent damage thereto. However, when cooling fluid flows through the mirror, the mirror is caused to vibrate or "jitter". One cause of this jitter involves the connection devices where the fluid enters and exits from the mirror. These connections are conventionally rigid and tied rigidly to the mirror and, as fluid flows through these rigid connection devices, a strain is placed on the mirror and jitter is induced.

This invention is thus directed to the elimination of jitter in cooled mirrors.

Thus, it is an object to this invention to improve the prior art cooled mirrors by providing such mirrors with free floating non-rigid connection joints to eliminate jitter induced into the mirror as the fluid is flowing through the mirror.

SUMMARY OF THE INVENTION

The invention which improves the prior art cooled mirrors by reducing the jitter induced by the rigid fluid connection devices comprises, a non-reactive, non-rigid, connection joint which includes at least two manifold blocks oriented orthogonally to each other and each containing a free floating, self-locating sleeve. This sleeve is pressure balanced to be non-reactive to the fluid and directs fluid entering the manifold toward the mirror. Each manifold/sleeve combination provides for a completely strain free and jitter-less mirror with respect to fluid attachments in at least two directions.

BRIEF DESCRIPTION OF THE DRAWING

FIG. 2 is an elevational cross-sectional view of an upper and lower manifold sleeve combination, taken along line 2—2 of FIG. 1, FIG. 3 is a cross-sectional view of one of the non-reactive connections taken along line 3—3 of FIG. 2, FIG. 5 is a perspective view showing the non-reactive connection joints for mirror constraint in three directions.

DETAILED DESCRIPTION

Figure 1:
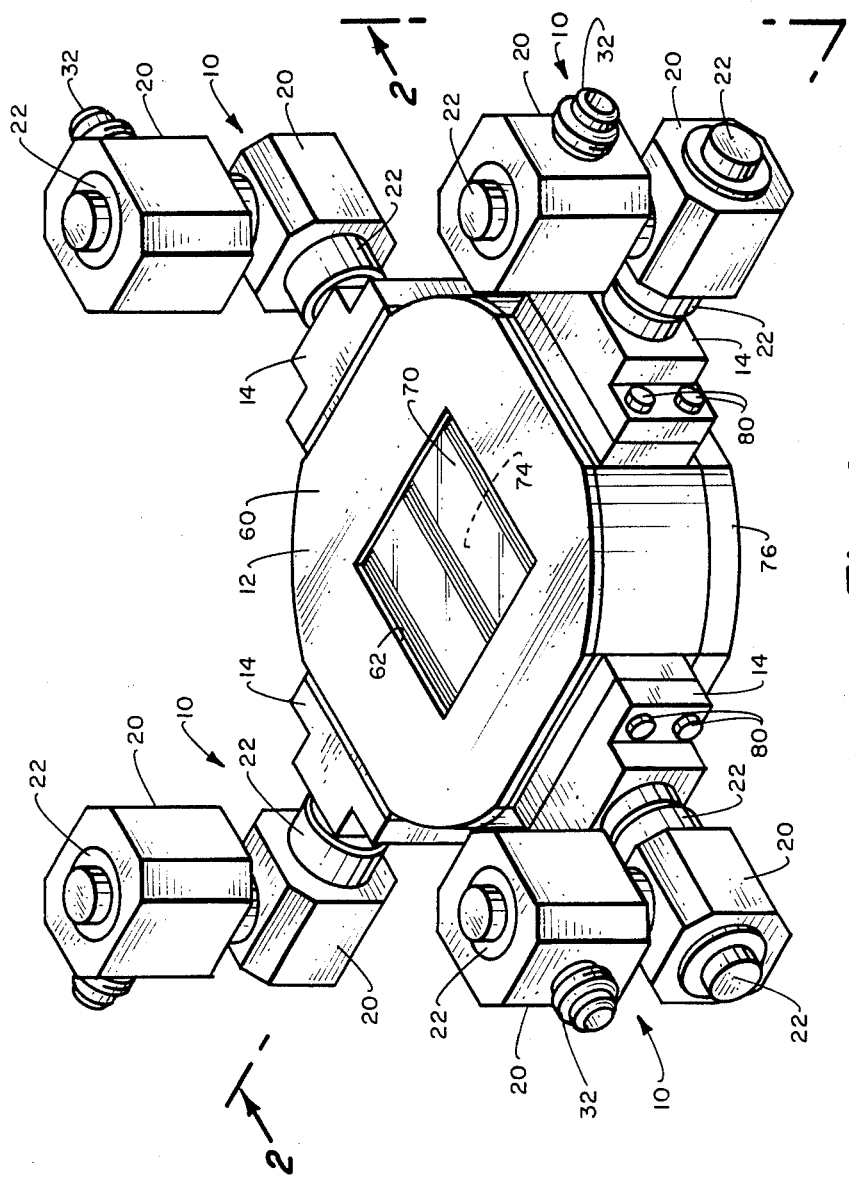
FIG. 1 is a perspective view of a mirror incorporating the non-reactive connection joints of this invention.
Figure 4:
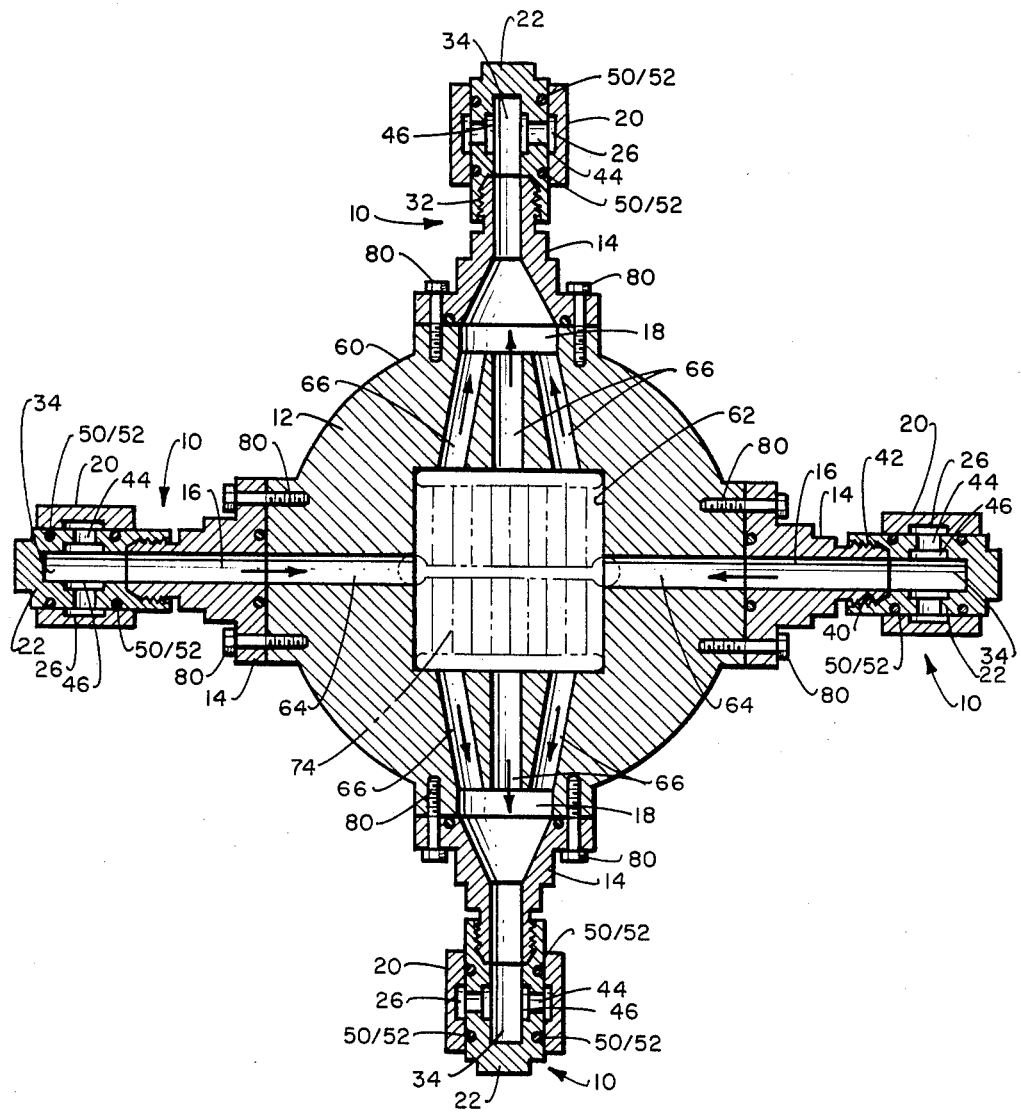
FIG. 4 is a cross-sectional end view showing more clearly the fluid passages within the mirror itself and taken along line 4—4 of FIG. 2.

As shown in FIGS. 1 and 4, there are four identical non-reactive fluid connection joints 10 tied (connected) to a cooled mirror 12 through adaptors 14. There are two inlets 16 and two outlets 18 for the flow of cooling fluid through the mirror 12 and one non-reactive fluid connection joint 10 is attached to each inlet and outlet.

Now in more detail and with reference also to FIG. 2 and 3, each non-reactive fluid joint 10 is made up of identical manifold blocks 20 with internal sleeves 22 and as shown in FIGS. 1 and 2, one manifold block-sleeve combination 20/22 is connected orthogonally to the other to form two stacks of manifold block-sleeve combinations 20/22. Since all manifold block-sleeve combinations 20/22 are identical, only one will be described in detail.

Thus, each manifold block 20 is centrally cylindrically bored as at 24 to receive the internal sleeve 22 which also is cylindrical. The inner bore 24 of the manifold block 20 is also provided with an annular groove 26 substantially midway thereof in communication with an orthogonal fluid passage 30 which extends through a conventional male end coupling 32 formed integrally on the manifold block 20. The inner sleeve 22 is shown longer than the manifold block and is provided with a central bore 34, shown as a blind bore. The blind bore 34 is shown as such simply because an end cap that would normally be threaded into the bore 34 to close the bore as a manufacturing technique is not shown in these figures but is shown as an integral end wall of the sleeve. The bore 34 is also provided with an additional enlarged counterbore 40 on the open end of the bore which acts as a socket to receive the male coupling 32 of a manifold block 20 or adaptor 14, as the case may be. The male couplings 32 on both the manifold block 20 and the adaptor 14 are identical and are externally threaded to be threadably connected together to form the fluid connection joint. The inner sleeve 22 is also provided with four radial passageways 44 and an annular groove 46, all of which open into the central bore 34. The annular groove 46 is of the same size and depth as the annular groove 26. Thus, fluid entering the passage 30 in the manifold block 20 is communicated to the bore 34 and out the manifold coupling, or adaptor coupling, as the case may be. To prevent leakage, the sleeve 22 is also provided with a pair of O-rings 50 located in suitable circumferential grooves 52 on each side of the four passageways 44 and engage the bore 34 in sealing relationship. The sleeve outer diameter is slightly less than the diameter of the bore 34 (by about 5 to 8 mils) so that the only contact between the sleeve and the bore is by way of O-rings. Thus except for this contact of the O-rings, the sleeves are symmetrical and free floating within the bore and the relationship of the passageway 30 and the passageways 44 and the respective annular grooves 26 and 46 is such that the sleeve is balanced against the influence of the pressure of the fluid flowing therethrough. Thus, with the force of the fluid balanced out, a net zero load is induced into the mirror via the manifold block-sleeve combinations 20/22. Additionally, the O-rings may be lubricated by a high vacuum silicone grease or may be teflon coated for low friction. Since the fluid connection joints are for a static mirror, friction is inconsequential. However, the fluid connection joints will accomodate small materials because of temperature changes without constraining the mirror.

The mirror 12 as shown in a circular manifold 60 with a central rectangular mirror cavity 62. This mirror cavity is in communication with inlets 16 and outlets 18 through a plurality of passages; two passages 64 and three passages 66 which open into the mirror cavity 62 for the flow of fluid to and from the cavity to cool the mirror 70, a semiconductor mirror, which is free floating in the cavity. These passages 64 and 66 also communicate with a plurality of passages 74, shown in phantom for illustrative purposes only, which distribute the fluid in the cavity. The mirror cavity is also sealed by a back plate 76 and a front plate 78 to form a fluid type chamber.

The adaptors 14 themselves are connected to the periphery of the mirror manifold 60, shown orthogonally connected, by any suitable means, screws 80 being shown, and terminate with a conventional coupling 42 for connection to an inner sleeve 22 of a manifold block-sleeve combination as above described.

It is to be understood that the mirror shown in these drawings is for illustration only as a means in connecting the non-reactive fluid connection joints to a mirror.

As shown, the two stacks of manifold block-sleeve combinations 20/22 allow the mirror to be unconstrained with 5 degrees of freedom; one in a radial direction perpindicular to the face of the mirror and, two, orthogonally to the first direction. Rotation of the mirrors optical axis is not of concern because of symmetry.

FIG. 5 shows additional manifold block-sleeve combinations 20/22 stacked for three dimensional decoupling (axes X,Y,and Z), although more manifold block-sleeve combinations may be used. There is no limitation.

In an actual embodiment of the invention, with water flowing through the mirror at four gallons per minute and with an inlet pressure of 110 psi, no mirror distortion or jitter was observed while monitoring the mirror surface with an interferometer.

I claim:

1. In a system having a fluid cooled mirror and provided with at least one inlet and outlet for the flow of fluid to cool said mirror, means providing non-reactive fluid connection joints between a source of fluid under pressure and said mirror;

said means providing the non-reactive connection means comprises a stack of manifold blocks with each manifold having an internal sleeve which is formed with passageways which are pressure balanced so that there are no radial or axial forces reactive to the flow of fluid wherein said non-reactive means decouples the mirror from the influence of fluid flowing in response to pressure and prevents jitter due to fluid connections to said inlet and outlet which would otherwise transfer vibrations to said mirror.

2. The system as claimed in claim 1 wherein O-ring seals are provided between said internal sleeves and said manifold block and provide the only connection therebetween.

3. The system as claimed in claim 2 wherein each sleeve has a socket as the means for connecting said manifold block and sleeve and mirror together.

4. The system as claimed in claim 3 wherein each manifold block is connected orthogonally to the other.

* * * * *